Aug. 2, 1927.
A. SANCHEZ
AUTOMOBILE SIGNAL DEVICE
Filed Jan. 22, 1926
1,637,962
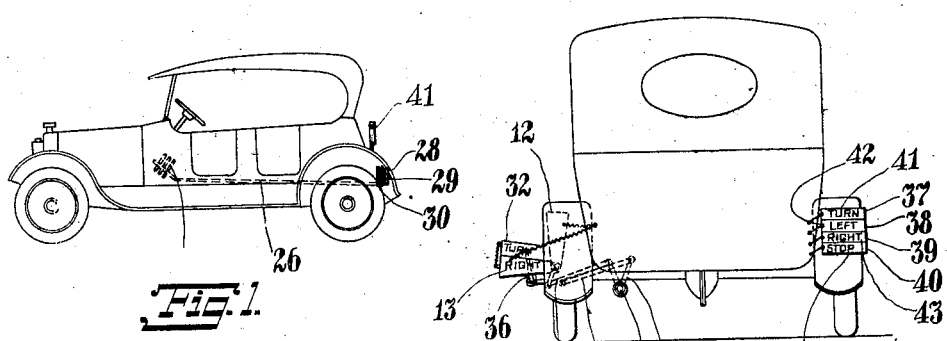
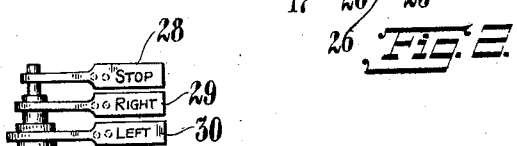
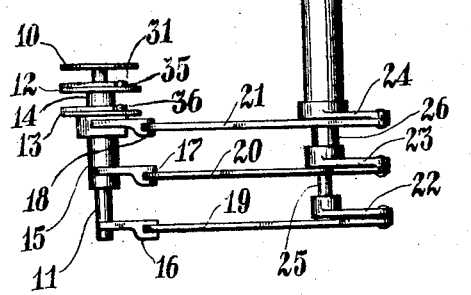
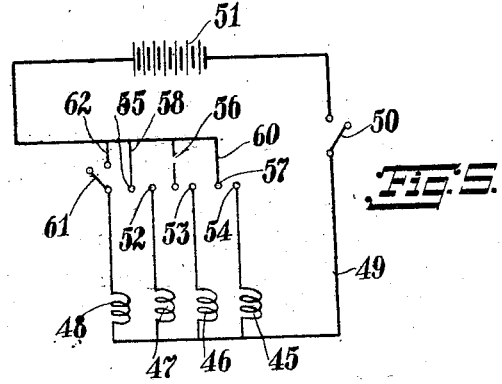
INVENTOR.
Adalberto Sanchez
BY
ATTORNEY Patented Aug. 2, 1927.

1,637,962

UNITED STATES PATENT OFFICE.

ADALBERTO SANCHEZ, OF KINGMAN, ARIZONA.

AUTOMOBILE SIGNAL DEVICE.

Application filed January 22, 1926. Serial No. 82,987.

This invention relates to a new and useful device in the nature of a direction indicator, said device being particularly adapted for use in connection with motor vehicles for the purpose of indicating to following vehicles the direction in which the driver of the vehicle, to which it is attached, intends to turn; and also intention to stop.

The object of the invention is to provide a signaling device of novel construction and arrangement of parts, hereinafter more fully described, claimed, and illustrated in the accompanying drawing, in which:

Fig. 1 shows a side elevation of a motor vehicle with device attached.

Fig. 2 shows a rear elevation of a motor vehicle with device attached.

Fig. 3 shows a top plan view of my device.

Fig. 4 shows a detail perspective view thereof.

Fig. 5 shows a diagrammatic view of the wiring.

The indicating member 10, having suitable wording thereon, is attached to a rod 11, the additional two indicating members 12 and 13 are attached to tubes 14 and 15 respectively, the tube 14 is rotatively mounted on the rod 11, and the tube 15 is rotatively mounted on the tube 14, which is rotatively attached to the body of the motor vehicle, under the rear fender, as clearly shown in the accompanying drawing. The levers 16, 17, and 18 are rigidly attached to the rod 11 and tubes 14 and 15, respectively, and have pivotally attached thereto links 19, 20, and 21, respectively, which are also pivotally attached to the levers 22, 23, and 24, respectively, which are rigidly attached to the rod 25 and the tubes 26 and 27, respectively. The tube 26 is rotatively mounted on the rod 25, and the tube 27 is rotatively mounted on the tube 26, the tube 27 being rotatively attached to any convenient part of the motor vehicle. The rod 25 has rigidly attached thereto an operating lever 28, the tube 26 has rigidly attached thereto an operating lever 29, the tube 27 has rigidly attached thereto an operating lever 30. The operating levers, 28, 29, and 30 have wording thereon, to correspond with the wording on the indicating members 10, 12, and 13, respectively.

The two supplementary indicating members 31 and 32 are attached to the two indicating members 12 and 13 respectively, as at 33, by hinges, so as to be vertically extended therefrom or hinged against the back of the two indicating members. The coil springs 34 are attached to the supplementary indicating members 31 and 32, and to the indicating members 12 and 13, so as to normally hold the two supplementary indicating members 31 and 32 hinged against the back of the two indicating members 12 and 13, respectively.

It will be understood that the operating levers are conveniently located so as to be operated by the foot or hand of the driver of the motor vehicle. The heretobefore described construction being such as will permit the driver of the motor vehicle, to which my improved device is attached, to extend, so as to be seen by the driver of the car at the rear, any one of the indicating members.

It will be further understood that the upright rods 35 and 36, suitably attached to the motor vehicle, and so located as to vertically extend the supplementary indicating members 31 and 32 respectively, when the operating levers 29 and 30, respectively, are operated. When the operating levers 29 and 30 are actuated, the indicating members are moved to a conspicuous position. It should be understood that while the signalling members are disposed beneath the fender, the upper supplementary indicating members 31 and 32 rest in a forwardly folded position adjacent the forward faces of the main indicating members 12 and 13 to which they are respectively hinged. This folded arrangement permits the employment of larger indicating elements than would otherwise be possible due to the confined and limited space beneath the fender and the limited width of the latter.

The pins 35 and 36 mounted on the fender are suitably positioned so as to project between the adjacent faces of the main and supplementary indicating members as they are rotated from beneath the fender in folded, superimposed relation. The pins 35 and 36 are stationary and rigidly mounted on the fender. As rotation of the indicating members continues, the hinged supplementary indicating elements are rotated rearwardly from their superimposed position until they reach the positions shown in Figure 4, the pins 35 and 36 being sufficiently long to hold the supplementary indicating plates 31 and 32 in upright position with their rear and forward faces respectively in the planes of the rear and forward faces of the main indicating plates 12 and 13.

It will be further understood that the above mentioned device is limited to project between the indicating members and the supplementary indicating members for daylight observation.

As a means of providing a night indicating signal, I have added in combination to the heretofore described device, four separate compartments, 37, 38, 39, and 40, suitably attached to one another, and also attached to the rear of the motor vehicle, at any suitable place, preferably to the rear fender, and have translucent front members 41, 42, 43, and 44 with any suitable wording therein. The electric light bulbs 45, 46, 47, and 48 are conveniently located with the four separate compartments 37, 38, 39, and 40 respectively, in sockets such as commonly used for this purpose, and are connected by a suitable wire 49 to a manually operated switch 50 which is similarly connected to any convenient source of electric current, such as a battery, as designated by the numeral 51, on the accompanying drawing. Three of the electric light bulbs are connected to contact points 52, 53, and 54, mounted on an insulating plate 50′, so located as to cause contact with the elbows 55, 56, and 57 of the day signal mechanism, when three of the heretobefore mentioned operating levers are operated, the elbows 55, 56, and 57, being suitably electrically connected to the battery 51, by wires 58, 59, and 60 respectively. The negative wire of the battery may be grounded in the usual manner directly to the frame of the vehicle and thus indirectly to the day signaling mechanism. The fourth electric light bulb is connected to a second manually operated switch 61, which is also connected to the battery 51, by the wire 62.

It will be understood that the manually operated switch 50, is used to disconnect the night indicating signal, and is conveniently attached to the motor vehicle, preferably on the dash board, and that the second manually operated switch 61 is preferably attached to the steering wheel of the car, so as to be easily reached by the hand of the operator of the motor vehicle to which my improved device is attached.

It will be further understood that my improved device may be of any suitable colors, or combination of colors, such as to comply with the law, and which will render my indicating members, translucent front members, and wording thereon more visible.

While I have above described the preferred form, construction and arrangement of the several elements employed, it will be understood that the device is, nevertheless, susceptible of considerable modification therein and I therefore reserve the privilege of resorting to all such changes as may be fairly embodied within the spirit and scope of the invention as claimed.

Having thus described my invention, what I claim as new, and desire to protect by Letters Patent of the United States is as follows:—

1. In a device of the class described, a plurality of pivotally mounted indicators disposed under the rear fender of an automobile, a plurality of operating levers connected to said indicators, a plurality of resilient members adapted to retain said indicators under said fender, a plurality of telescoping shafts mounted beneath the floor of said automobile and extending from the rear thereof to a position forward of the driver's seat, and foot pedals attached to said telescoping shafts for rotating the same to actuate said levers for causing said indicating members to be rotated from beneath said fender to a conspicuous position.

2. In a device of the class described, a plurality of pivotally mounted indicators disposed under the rear fender of an automobile, a plurality of operating levers connected to said indicators for rotating said indicating members from beneath said fender, a plurality of resilient members adapted to retain said indicators under said fender, supplementary indicating members hinged to said pivotally mounted indicators, springs attached to said hinged member for normally holding the latter adjacent the pivotally mounted indicators, and means mounted on said fender adapted to engage said hinged indicating member for rotating the same to a conspicuous position upon rotation of said pivotally mounted indicator.

3. In a device of the class described, the combination with a main indicating plate pivotally mounted on and disposed beneath a fender, of a supplementary indicating plate hinged to said main indicating plate, a spring attached to said plates for normally holding the latter in superimposed position, said supplementary indicating plate being retained in advance of said main indicating plate when both are disposed beneath said fender, means for rotating said plates from beneath said fender, and means comprising a rod mounted on said fender adapted to project between the adjacent faces of said main and supplementary plate for rotating the latter from superimposed position to a visible position in alignment with said main plate when both plates are rotated from beneath said fender.

In testimony whereof I have affixed my signature.

ADALBERTO SANCHEZ.